(12) United States Patent
Rasband et al.

(10) Patent No.: US 9,716,976 B2
(45) Date of Patent: Jul. 25, 2017

(54) WIRELESS SENSOR NETWORK CONTROLLED LOW ENERGY LINK

(71) Applicant: Tyco Fire & Security GmbH, Neuhausen am Rheinfall (CH)

(72) Inventors: Paul B. Rasband, Lantana, FL (US); Jorge F. Alicot, Davie, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/240,059

(22) Filed: Aug. 18, 2016

(65) Prior Publication Data
US 2016/0360358 A1  Dec. 8, 2016

Related U.S. Application Data

(63) Continuation of application No. 14/618,237, filed on Feb. 10, 2015, now Pat. No. 9,426,616.

(51) Int. Cl.
| | | |
|---|---|---|
| H04W 4/02 | (2009.01) | |
| H04W 4/00 | (2009.01) | |
| H04W 52/02 | (2009.01) | |
| H04L 29/08 | (2006.01) | |
| H04B 17/318 | (2015.01) | |
| H04W 84/18 | (2009.01) | |

(52) U.S. Cl.
CPC ............ *H04W 4/02* (2013.01); *H04B 17/318* (2015.01); *H04L 67/12* (2013.01); *H04L 67/18* (2013.01); *H04W 4/005* (2013.01); *H04W 4/008* (2013.01); *H04W 52/0219* (2013.01); *H04W 84/18* (2013.01); *Y02B 60/50* (2013.01)

(58) Field of Classification Search
CPC ........ H04W 4/02; H04W 4/008; H04W 84/18
USPC ............. 455/41.1, 41.2, 404.1, 404.2, 456.1; 370/338, 406; 340/539.23; 342/450, 452
See application file for complete search history.

(56) References Cited

U.S. PATENT DOCUMENTS

| | | |
|---|---|---|
| 2005/0057370 A1 | 3/2005 | Warrior et al. |
| 2005/0074019 A1 | 4/2005 | Handforth et al. |
| 2009/0147702 A1 | 6/2009 | Buddhikot et al. |
| 2009/0252032 A1 | 10/2009 | Jiang et al. |
| 2010/0094583 A1 | 4/2010 | Borean et al. |
| 2010/0141437 A1 | 6/2010 | Karam et al. |
| 2010/0283579 A1* | 11/2010 | Kraus ................ G07C 9/00944 340/5.7 |
| 2012/0201179 A1 | 8/2012 | Das et al. |
| 2013/0259016 A1 | 10/2013 | Xhafa et al. |
| 2014/0155031 A1* | 6/2014 | Lee .......................... G06F 21/35 455/411 |
| 2014/0340196 A1* | 11/2014 | Myers ................ G07C 9/00309 340/5.61 |
| 2014/0355582 A1 | 12/2014 | Kamath et al. |

(Continued)

*Primary Examiner* — Kimberly A Williams
(74) *Attorney, Agent, or Firm* — Fox Rothschild LLP; Robert J. Sacco; Carol E. Thorstad-Forsyth

(57) ABSTRACT

Systems (100) and methods (200) for operating a sensor system. The methods comprise: performing first operations by a Wireless Sensor Network (102) to (a) configure operations of WSN end nodes (104, 134-138) and (b) control Bluetooth Low Energy ("BLE") link activity within a BLE network; and performing second operations by the BLE network to (a) find people or objects (156) within a specified area and (b) provide services to users of mobile communication devices which are BLE enabled (152) and reside within the specified area.

16 Claims, 3 Drawing Sheets

(56) References Cited

U.S. PATENT DOCUMENTS

| | | |
|---|---|---|
| 2015/0072628 A1 | 3/2015 | Mackie |
| 2015/0245182 A1 | 8/2015 | Scagnol et al. |
| 2015/0289088 A1 | 10/2015 | Terrazas |
| 2015/0309159 A1 | 10/2015 | Boerhout |
| 2015/0319674 A1 | 11/2015 | Hughes et al. |
| 2016/0057599 A1 | 2/2016 | Lim et al. |
| 2016/0088424 A1* | 3/2016 | Polo ............... H04W 84/18 455/41.1 |
| 2016/0165387 A1* | 6/2016 | Nhu ............... H04W 4/008 455/41.1 |
| 2016/0189514 A1* | 6/2016 | Todasco ............ G08B 21/02 340/8.1 |

\* cited by examiner

Go To FIG. 2B

WIRELESS SENSOR NETWORK CONTROLLED LOW ENERGY LINK

CROSS-REFERENCE TO RELATED APPLICATIONS

This application is a continuation application of, and claims priority to, U.S. patent application Ser. No. 14/618,237 filed on Feb. 10, 2015, now granted U.S. Pat. No. 9,426,616. The contents of the above listed documents are herein incorporated by reference.

FIELD OF THE INVENTION

This document relates generally to Wireless Sensor Network ("WSN") based systems. More particularly, this document relates to systems and methods for providing controlled low energy links (e.g., Bluetooth® low energy links) in WSN based systems.

BACKGROUND OF THE INVENTION

Bluetooth® Low Energy ("BLE" or "Bluetooth® Smart") is a particular type of wireless communication technology that consumes only a fraction of the power of classic Bluetooth® radios. In this regard, BLE is designed especially for short-to-moderate-range point-to-point communication between two or more BLE enabled devices. The BLE enabled devices comprise BLE peripheral devices ("BLE beacons") and BLE central devices ("BLE hubs"). A BLE beacon is often a fixed or mobile electronic device powered by a coin-cell battery, which transmits a periodic code. A BLE hub is often a mobile device (e.g., a smart phone) or gateway to a Local Area Network ("LAN") or WiFi network. The BLE enabled devices can have a range up to 200 feet and beyond (particularly where longer ranges are desired, such as in sensor applications).

BLE link technology has traditionally been applied to problems such as smart signs, health data monitoring (i.e., wireless attachment to medical equipment) and access control. BLE link technology operates in the 2.400 GHz-2.4835 GHz ISM band, but uses a different set of channels than the classic Bluetooth® technology. Within a channel, data is transmitted using Guassian frequency shift modulation. BLE supports very short data packets (8-27 octets) that are transferred at a bit rate of 1 Mbps. The maximum transmit power of a BLE enable device is 10 mW.

SUMMARY OF THE INVENTION

The present disclosure concerns implementing systems and methods for operating a sensor system. The methods comprise: performing first operations by a WSN to (a) configure operations of WSN end nodes and (b) control BLE link activity within a BLE network; and performing second operations by the BLE network to (a) find people or objects within a specified area and (b) provide services to users of mobile communication devices which are BLE enabled and reside within the specified area. Notably, the operations of at least one WSN end node can be periodically re-configured during a BLE session in which the WSN end node has a BLE connection to at least one of the mobile communication devices. The periodic re-configuring may be performed based on information received from the WSN end node and the mobile communication device indicating or that is useful in determining relative locations of the WSN end node and the mobile communication device.

In some scenarios, the BLE link activity is controlled by deactivating a BLE peripheral node when a first condition exits and activating the BLE peripheral node when a second condition exits. The first condition is a normal operating condition and the second condition is an emergency condition.

Additionally or alternatively, a first mobile communication device communicates information to the WSN (e.g., via a WiFi or cellular connection to the network to which the WSN is directly or indirectly connected using wired and wireless internet protocols) that indicates at least one of a type of object or person that is trying to be located, a particular object or person that is trying to be located, a desired behavior of a BLE peripheral node associated with the object or person that is trying to be located, and a location of the mobile communication device within the specified area. In this case, the first operations comprise: invoking activation of the BLE peripheral node based on the information communicated from the first mobile communication device to the WSN; and/or configuring third operations of the BLE peripheral node based on the information communicated from the first mobile communication device to the WSN. The third operations are configured such that the signal power, antenna pattern or range of the BLE peripheral node is increased or decreased.

In those or other scenarios, the second operations comprise: establishing a BLE link between the first mobile communication device and the BLE peripheral node; receiving a BLE interrogation signal at the BLE peripheral node which was transmitted from the first mobile communication device; and issuing an alarm of the BLE peripheral node in response to the BLE interrogation signal in accordance with a manner in which the BLE peripheral node was configured by the WSN. The second operations may also comprise outputting information from a first mobile communication device indicating relative locations of the first mobile communication device and a BLE peripheral node of the BLE network.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
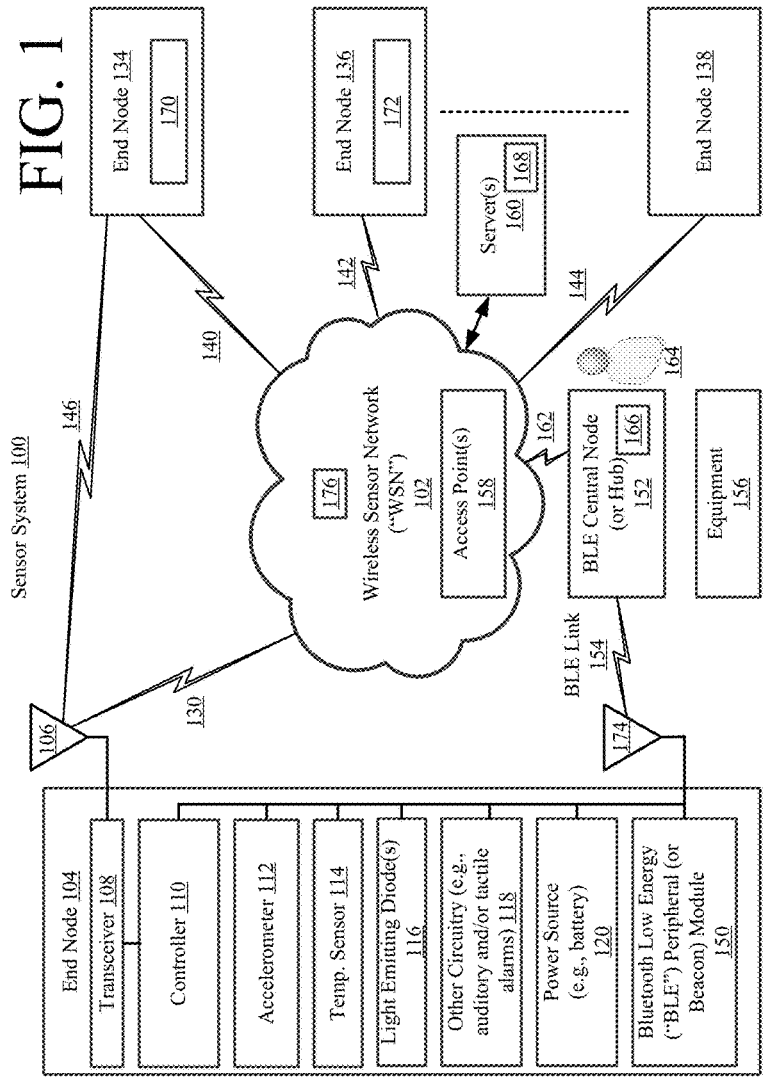
FIG. 1 is a schematic illustration of an exemplary sensor system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

WSNs are applied to many data collection and control/actuation problems. WSNs have significantly greater range and diversity of application as compared to that of BLE networks, due in part to the inclusion of mesh topologies and multi-hop message delivery (e.g., such as is provided in many WSN via 6LoWPAN running on top of the 802.15.4 Media Access Control ("MAC") protocol layer and the Physical ("PHY") protocol layer of the wireless protocol stack). Put another way, WSNs have one set of strengths and BLE networks have another set of strengths, even though in many applications either technology can be employed.

Herein, a system will be described which employs both a WSN and a BLE network. The WSN is described as comprising a WSN based on 802.15.4/6LoWPAN. The present invention is not limited in this regard. Any alternative WSN protocol (e.g., Zigbee®, Z-Wave®, wireless HART®, etc.) can be employed in accordance with a particular application. Notably, the WSN and BLE network are used for different purposes. For example, the WSN is generally used as a means to (a) configure operations of end nodes thereof and (b) facilitate the control of BLE link activity. The BLE network is used to provide a means to (a) find people, objects, items, articles and/or equipment within a facility or geographic area, (b) provide services (e.g., emergency based services—provide a safe exit route through a burning building based on real time sensor information) to people possessing mobile communication devices (e.g., smart phones) within the facility or geographic area, and/or (c) provide consumer information services over the BLE link to the user of the smart phone at their particular location. With regard to (c), the user can be provided with information specific to their context and need, which context may be transmitted to remote applications controlling specific behavior of the BLE beacon, via the WSN back-network at the time the service is actually requested using the phone and a cellular network message to a remote web-based application.

As indicated above, BLE link activity is controlled by applications running inside and/or accessible via a WSN. Specifically, a BLE link may be turned off under normal conditions, but activated by a WSN-linked control application when a special event occurs (e.g., fire or other emergency). Alternatively or additionally, the BLE link may be active in one mode under one set of conditions, and then converted to a second mode under a different set of conditions via the application running inside or accessible via the WSN. The WSN-linked control application may reside in any one (or even more than one) node of the WSN including a second (external) network's gateway, a WSN access point connected to the gateway, a local server accessible via the second network, and/or a remote and/or cloud-based real or virtual server.

In the present disclosure, BLE links are assumed to be short range (e.g., 1-10 meters), point-to-point with no re-transmission involved (i.e., no multi-hopping). It is true that BLE technology can be employed in multi-hop networks where a BLE enabled device receives a message from a second BLE enabled device and re-transmits it to a third BLE enabled device—even over a large distance. There is no physical reason why BLE technology may not be employed as just another WSN technology. However, BLE has been chosen by various markets and application standard organizations as the basis for various use cases which demand that the BLE technology be used in a certain way which entails intentionally short range, single-hop transmissions. A good example of this is proximity detection and the many use cases requiring proximity detection (person in a position, person close to another person, person close to a piece of equipment, etc.) which are being rapidly standardized by groups in the healthcare and consumer electronics industries. One of the most important points of utility of the present invention is to allow remote (web-based) control of the BLE enabled nodes, despite the fact that the BLE enabled nodes are not being operated in a way which creates a general (large) mesh network with direct web connectivity. The great utility of the WSN network is its general flexibility and, hence, its anticipated pervasiveness as a means of controlling distributed devices such as BLE beacons. The great utility of the BLE in this case is its anticipated pervasiveness support by consumer-controlled smart phone.

Referring now to FIG. 1, there is provided a schematic illustration of an exemplary sensor system 100. Sensor system 100 is generally configured to act as a security and access control system, fire monitoring system, person or asset location system, etc. In this regard, sensor system 100 comprises a plurality of end nodes 104, 134, 136, 138 and a WSN 102. The WSN 102 may include, but is not limited to, a mesh network. Mesh networks are well known in the art, and therefore will not be described herein. Still, it should be understood that the mesh network comprises a plurality of sub-networks. If an end node's communication link with a particular sub-network fails, then the end node can automatically join another sub-network within the WSN 102.

The end nodes 104, 134, 136, 138 can include, but are not limited to, electronic window locks, electronic door locks, motion sensors (e.g., coupled to equipment 156), area security devices (e.g., proximity sensors and/or video cameras), fire detectors, electronic access cards worn by employees, and/or tags secured to objects. Each of the listed types of end nodes are well known in the art, and therefore is not described in detail herein. Each end node can be of any type.

In FIG. 1, end node 104 is shown as including an electronic communication and sensing device which is attached to a piece of equipment 156. Equipment 156 may be a fixed piece of equipment or a mobile piece of equipment. Since end node 104 includes an electronic communication and sensing device, it comprises an antenna 106, a transceiver 108, a controller 110, an accelerometer 112, a temperature sensor 114, a Light Emitting Diode ("LED") 116, other circuitry 118 (e.g., auditory alarms, tactile alarms, video cameras, filters, cryptographic modules) and a power source (e.g., a battery) 120. The antenna 106 and transceiver 108 facilitate communications with the WSN 102 and/or other end nodes via respective wireless WSN communication links 130, 140-146. At any given time, end node 104 performs specified functions (e.g., collecting sensor data, capturing images, collecting audio, emitting light, filtering data, analyzing data, transmitting data, outputting indictors, executing algorithms, acting as a sub-coordinator, etc.) for which it has been configured by the WSN 102.

Notably, end node 104 is BLE enabled, and therefore also comprises a BLE peripheral module (or BLE beacon) 150. BLE peripheral module 150 implements BLE technology designed for short-to-moderate-range point-to-point communication between itself and other BLE enabled devices, such as a BLE central node (or BLE hub) 152. The BLE central node 152 can include, but is not limited to, a mobile communication device (e.g., a smart phone, a personal assistant, or other mobile computing device) that is BLE enabled (i.e., implements BLE technology). BLE technology is well known in the art, and therefore will not be described herein. Similarly, mobile communication devices are well known in the art. Any known or to be known BLE technology and/or mobile communication device can be used herein without limitation. In all cases, the BLE components of the network nodes 104, 134-138, 152 can be implemented in hardware, software and/or a combination of hardware and software. The hardware includes, but is not limited to, one or more electronic circuits.

Establishment of the BLE communication links 154 are at least partially controlled by the WSN. In this regard, the WSN 102 comprises a WSN-linked control application 176. The WSN-linked control application may reside in any one (or even more than one) node of the WSN including a second (external) network's gateway (not shown), a WSN access point 158 connected to the gateway, a local server (not shown) accessible via the second network (not shown), and/or a remote and/or cloud-based real or virtual server 160.

Although end node 104 is shown as having two separate and distinct electronic components for WSN based communications and BLE based communications, the present invention is not limited in this regard. A single electronic circuit can alternatively be employed which performs both WSN based operations and BLE based operations in accordance with software running thereon (e.g., a WSN based firmware and a BLE based firmware). In this case, a single antenna may be provided with the end node 104, rather than two antennas as shown in FIG. 1. A switch can be provided for controlling connections between the antenna and each of the WSN and BLE functional components. A common power source (e.g., a battery, an energy harvesting device or mains-power connection) and a converter/voltage regulator may be provided to serve both the WSN and BLE functional components.

During operation, the BLE technology of sensor system 100 can be used to find a person, a piece of equipment or other item within a facility (e.g., a building or warehouse with many cluttered rooms or areas). For example, a person 164 in possession of the BLE central node 152 is searching for equipment 156 within the facility. A software application 166 is installed on the BLE central node 152 by which the person can: specify a particular type of equipment or piece of equipment (e.g., by name, ID number, or assigned custodian) for which (s)he is searching (e.g., via a menu or other entry option); select the behavior to be performed by a BLE peripheral module in response to its reception of a signal transmitted from the BLE central node (e.g., whether the BLE peripheral module is to output a visual indicator, an auditory indicator, a tactile indicator and/or an electrical power measurements); communicate specified information, a unique identifier of the BLE central node and/or location information to the WSN 102 for use thereby in configuring operations of and/or invoking activation of the BLE peripheral module contained in the end node coupled to a particular piece of equipment; establish a BLE connection to the BLE peripheral module; and/or obtain information from the BLE peripheral module which causes the software application 166 to run with some specificity and/or inform the person that (s)he is in proximity to the desired equipment 156. Notably, the BLE central nodes communication with the WSN 102 can be direct or indirect via a cell network (not shown).

In some scenarios, the WSN 102 may control and/or change the signal power of the BLE peripheral module and/or antenna pattern of the BLE antenna 174 based on information received from the BLE central node 152 and/or BLE peripheral module 150 (e.g., location information and/or signal power measurement information). For example, the WSN 102 can command the BLE peripheral module 150 to keep its signal power relatively low (e.g., less than 0 dB) or operate with a relatively low transmit power to conserve power and/or prevent bandwidth crowding with unnecessary energy during a given period of time. If and when the BLE central node 152 receives a BLE signal transmitted from the BLE peripheral module, the BLE central node is assumed to be near the BLE peripheral module. Alternatively, the WSN 102 can command the BLE peripheral module 150 to operate with a relatively high transmit power during periods when a person desires to interact with the end node 104 from relatively far away (e.g., the transmit power of the BLE peripheral module may be increased for a certain period of time when the person is looking for a particular piece of equipment that is not where it is supposed to be so that the person can find the equipment relatively quickly and with minimal effort). The present invention is not limited to the particulars of these examples.

The WSN 102 can manage and/or change any properties, characteristics, stored data, operations and/or behavior of one or more BLE peripheral modules in accordance with a particular application at any given time. In this regard, a BLE beacon's duty cycle (i.e., the number of BLE signals transmitted from the BLE peripheral module) may be altered by the WSN 102 (either increased to provide higher resolution tracking by the BLE central node, or decreased to conserve power). Additionally or alternatively, the WSN 102 can: provide the BLE peripheral module 150 with situation specific content (e.g., the parts of a building which are known to be on fire and which must not be considered as part of an evacuation route) that is to be provided to BLE central nodes in proximity thereto; increase a transmit power of the BLE peripheral module in order to give significantly greater range thereto so as to increase the chances that people possessing BLE central nodes may receive emergency notification beacon messages; change modes of the BLE peripheral module (e.g., a power conservation mode, a higher performance mode, etc.); and/or change security-related characteristics of the BLE peripheral module (e.g., nonces, hash algorithms, seed numbers, active security algorithms, etc.) in order to respond to actual or potential security breaches.

Additionally or alternatively, the back-end analytics and BLE control logic (located in a server 160 or distributed throughout the WSN 102) is used to control the power of one or more BLE peripheral modules representing a sub-set of a plurality of BLE peripheral modules in such a way that the location of the BLE central node can be more accurately determined. In other words, when the BLE central node is located within a service area of a particular BLE peripheral module, the transmit power of the BLE peripheral module and surrounding BLE central nodes can be increased and/or reduced via control messages sent through the WSN 102 according to an algorithm which is designed to make clear the exact location of the BLE central node relative to the sub-set of BLE peripheral modules.

In the simplest approach, the BLE central node 152 can make an initial contact with a first BLE peripheral module 150 (i.e., receiving its signal sent at normal power). Thereafter, the BLE central node 152 then phone contacts a back-end control software application 168 (via a cellular network) telling the control application that the BLE central node is in contact with a particular BLE peripheral module. The control software application 168 would then use the WSN to increase the transmit power used by second and third BLE peripheral modules 170, 172 in the vicinity of the first BLE peripheral module (e.g., in a series of stepwise increases in power). The software application 166 on the BLE central node 152 notes the time and/or order in which the second and third BLE peripheral modules were received. The BLE central node 152 then sends a report via the cell network (not shown) to the back-end software application listing the times and signal numbers of BLE signals received thereat. The back-end software application 168 is able to infer (using well known simple or modified triangulation techniques) the location of the BLE central node 152.

As noted above, the BLE peripheral module 150 may perform certain operations in response to its reception of a BLE signal transmitted from the BLE central node 152. For example, the BLE peripheral module 150 outputs an audio alarm, a visual alarm, a tactile alarm and/or a radio signature alarm message indicating a distance between the BLE peripheral module 150 and the BLE central node 152. In the radio signature case, the BLE central node 152 outputs information to the person 164 specifying whether (s)he is traveling towards (and thereby getting closer to the BLE peripheral module 150) or traveling away (and thereby getting further away from the BLE peripheral module 150). The information can be displayed as a map showing a measured distance between the two devices 150, 152, a graph, a chart, a hot-cold scale and/or other graphical user interface.

The type of alarm output from the BLE peripheral module 150 can be controlled by the BLE central node 152 via the WSN 102, as described above. For example, if the person 164 is trying to find the equipment 156 during business hours in which customers are present within the facility, then it is may not desirable to have the BLE peripheral module 150 output auditory alarms (e.g., beeps). In this case, the person 164 performs user-software interactions with the BLE central node 152 to have the WSN 102 communicate a command signal to the BLE peripheral module 150 for disabling the auditory alarm(s) 118 thereof and/or enabling the circuitry for generating radio signature alarm messages. In contrast, if the person 164 is trying to find the equipment 156 during non-business hours in which customers are not present within the facility, then it may not desirable to have the BLE peripheral module 150 output auditory, visual and/or tactile alarms. In this case, the person 164 performs user-software interactions with the BLE central node 152 to have the WSN 102 communicate a command signal to the BLE peripheral module 150 for enabling the auditory alarm(s) 118, visual alarms 116, and/or tactile alarms 118. The present invention is not limited to the particulars of this example.

In some scenarios, the BLE devices 150, 152 continuously or periodically communicate information useful in determining their relative locations to each other and/or the WSN 102. For example, the BLE peripheral device 150 may send a response message to the BLE central node 152 at N different power levels, where N is an integer. The response message may include a transmit power and an expected received signal strength at a given distance. In this case, the BLE central node 152 can infer its distance to the BLE peripheral device 150 by comparing the actual received signal strength to the expected received signal strength. The inferred distance can then be communicated from the BLE central node 152 to the WSN 102. The present invention is not limited to the particulars of this example. Other location determining techniques can be employed herein without limitation, such as a triangulation technique and/or an attenuation mapping based technique.

Based on the inferred distance between the BLE devices 150 and 152, the transmit power and/or antenna pattern of the BLE peripheral module 150 can be adjusted by the WSN 102 once or a plurality of times during the period of time in which the person 164 is trying to find the equipment 156. Upon finding the equipment 156, the person 164 can perform operations to obtain other information from the BLE peripheral module 150 (e.g., measurement data from an accelerometer 112, a temperature sensor 114, or other circuitry 118). The other information can include, but is not limited to, sensor data, emergency related data (e.g., emergency exit route data), equipment specification data, equipment promotional data and/or equipment purchase/rent/check-out data.

Figure 2A:
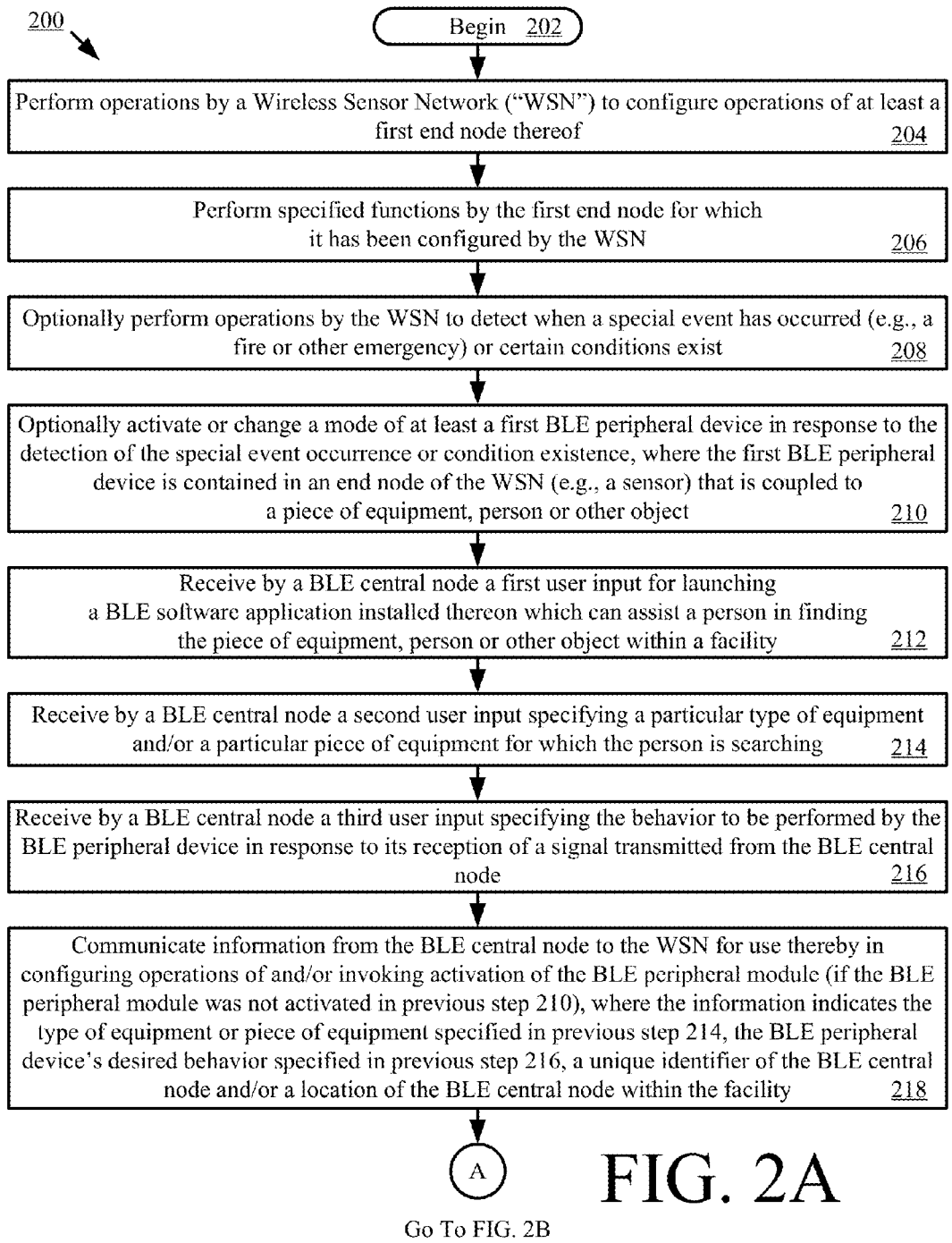
FIGS. 2A-2B (collectively referred to as FIG. 2) provide a flow diagram of an exemplary method for operating a sensor system.
Figure 2B:
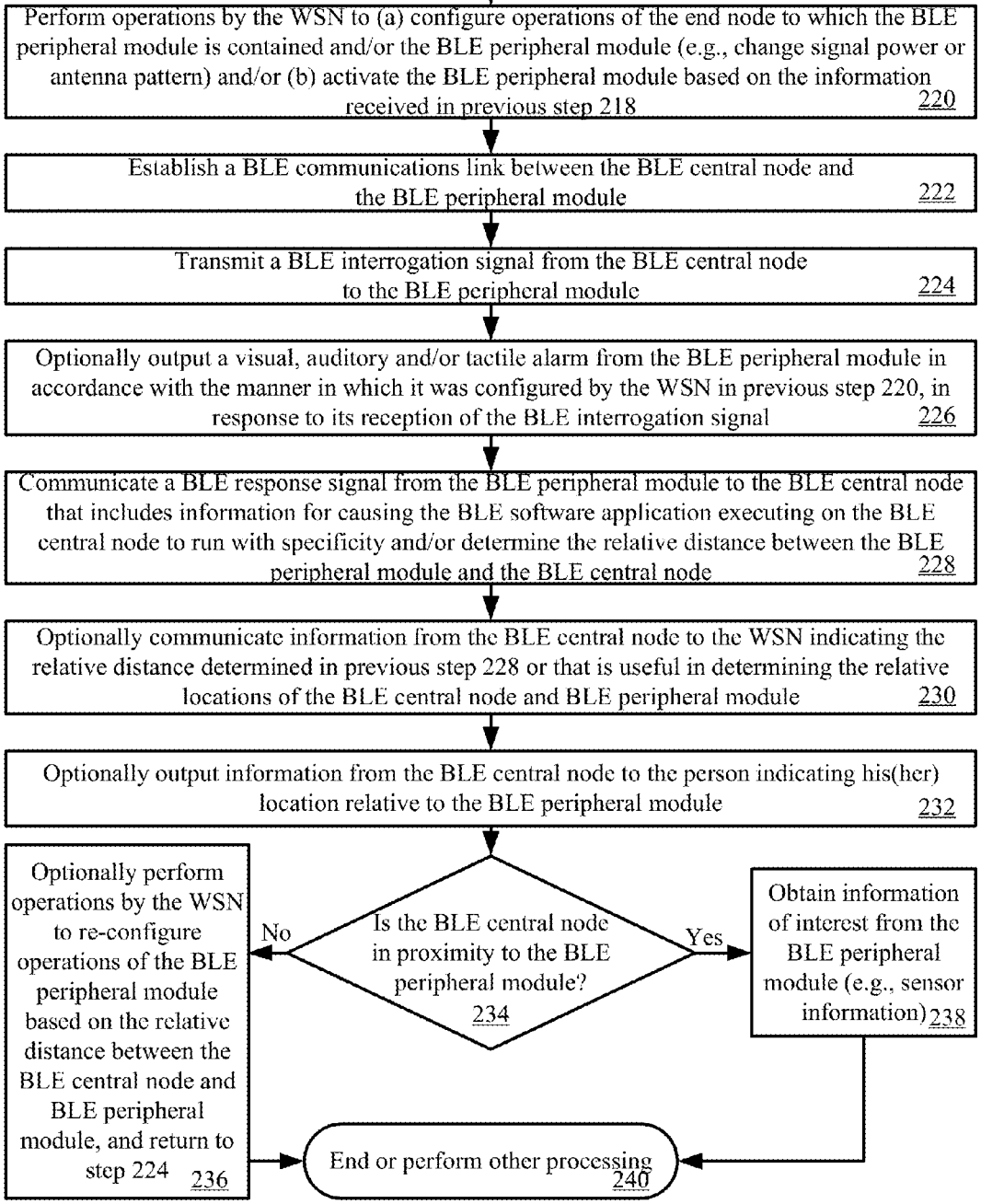

Referring now to FIGS. 2A-2B, there is provided a flow diagram of an exemplary method 200 for operating a sensor system (e.g., sensor system 100 of FIG. 1). Method 200 begins with step 202 and continues with step 204 where a WSN (e.g., WSN 102 of FIG. 1) performs operations to configure operations of at least one first end node thereof (e.g., end node 104 of FIG. 1). For example, the WSN can send command signals to the first end node directing it to perform at least one of the following operations: collect sensor data; capture images; collect audio; emit light; filter data; analyze data; transmit data; output indicators; execute algorithms; and act as a sub-coordinator. Thereafter, in a next step 206, the first end node performs specified functions for which it has been configured by the WSN.

Sometime thereafter, optional steps 208 and 210 are performed. These steps involve: performing operations by the WSN to detect when a special event has occurred (e.g., a fire or other emergency) or certain conditions exists; and activating or changing a mode of at least a first BLE peripheral module (e.g., BLE peripheral module 150 of FIG. 1) in response to the detection of the special event occurrence or condition existence. The first BLE peripheral module is contained in an end node (e.g., end node 104 of FIG. 1) of the WSN that is coupled to a piece of equipment (e.g., equipment 156 of FIG. 1), person or other object.

In a next step 212, a BLE central node (e.g., BLE central node 152 of FIG. 1) receives a first user input for launching a BLE software application (e.g., BLE software application 166 of FIG. 1) installed thereon. The BLE software application is operative to assist a person in finding the piece of equipment, person or object within a facility (e.g., a building). After the BLE software application has been launched, steps 214-216 are performed where the BLE central node receives second and third user inputs. In the equipment scenario, the second user input specifies a particular type of equipment and/or a particular piece of equipment for which the person is searching. In other types of scenarios (e.g., find a person or other object), the second user input may specify different information (e.g., a type of person, a unique identifier for a person, a type of object, a unique identifier for an object, etc.). The third user input specifies the behavior to be performed by the BLE peripheral module in response to its reception of a signal transmitted from the BLE central node. For example, the third user input may specify that the BLE peripheral module cause an end node to output a visual alarm, an auditory alarm, a tactile alarm and/or information useful in determining an actual or approximate distance between the BLE peripheral module and the BLE central node, when the BLE peripheral module receives a BLE interrogation signal from the BLE central node. Alternatively or additionally, the third user input may specify that one or more alarms (e.g., the auditory alarm) should be deactivated at the present time and/or automatically reactivated at a later time.

The information specified by the first, second and third user inputs is then communicated from the BLE central node to the WSN, as shown by step 218. At the WSN, the information is used in step 220 of FIG. 2B to invoke activation of the BLE peripheral module (if the BLE peripheral module was not activated in previous step 210) and/or configure operations of the end node to which the BLE peripheral module is contained. The operations may additionally be configured based on the location of the BLE central node within the facility. The BLE central node's location can be acquired using any known or to be known location determining technique.

The BLE peripheral module may be configured such that it will provide certain services to the BLE central node once a BLE connection has been established therebetween. The services can include, but are not limited to, person/object/equipment locating services, sensor reporting services, emergency based services (e.g., providing a safe exit from a building, providing a map showing the path of travel of one or more individuals through the building, providing a map showing areas within a building that are unsafe or have an emergency issue therein, etc.), equipment purchase/lease/check-out based services, and/or equipment utilization based services (e.g., providing specifications and/or instructions on how to use/repair a piece of equipment). The transmit signal power, antenna pattern and/or range of the BLE peripheral module may alternatively or additionally be changed at this time. For example, the WSN can command the BLE peripheral module to operate with a relatively low or high transmit power.

Referring again to FIG. 2B, method 200 continues with step 222-228 in which various BLE communication operations are performed. These steps involve: establishing a BLE communications link (e.g., BLE link 154 of FIG. 1) between the BLE central node and the BLE peripheral module; transmit a BLE interrogation signal from the BLE central node to the BLE peripheral module; and perform operations at the BLE peripheral module in response to its reception of the BLE interrogation signal. For example, the BLE peripheral module may output an alarm. Additionally, the BLE peripheral module communicates a BLE response signal to the BLE central node. The BLE response signal includes information that (a) causes the BLE software application executing on the BLE central node to run with specificity and/or (b) is useful in determining the relative distance between the BLE central node and the BLE peripheral module. The relative distance can be determined by the BLE central node and/or the WSN. In the WSN scenarios, the BLE central node communicates information to the WSN that is useful in determining the actual or approximate relative locations of the BLE central node and/or the BLE peripheral module within a facility, as shown by step 230. In either scenario, the BLE central node may optionally communicate information indicting the relative distance determined thereby.

Once the relative distance has been determined, step 232 is performed where the BLE central node outputs information to the user thereof (e.g., person 164 of FIG. 1) indicating his(her) location relative to the BLE peripheral module. For example, the BLE central node may display on a display screen thereof (not shown) a map, a graph, a chart, a hot-cold scale and/or other graphical user interface showing or indicating the distance between itself and the BLE peripheral module, the direction pointing towards the BLE peripheral module, the relative locations of the two BLE enabled devices, and/or whether the BLE central node is traveling towards/away from the BLE peripheral device.

Upon completing step 232, a decision step 234 is performed to determine if the BLE central node is in proximity to the BLE peripheral module. If the BLE central node is in proximity to the BLE peripheral module [234:YES], then step 238 is performed where the BLE central node obtains information of interest from the BLE peripheral module. For example, the BLE central node may be provided sensor information, emergency related information (e.g., emergency exit route information), equipment specification information, equipment promotional information and/or equipment purchase/rent/check-out information. Thereafter, step 240 is performed where method 200 ends or other processing is performed.

In contrast, if the BLE central node is not in proximity to the BLE peripheral module [234:NO], then optional step 236 is performed where the WSN re-configures operations of the BLE peripheral module and/or associated end node based on the relative distance between the BLE central node and the BLE peripheral module. For example, the transmit signal power, antenna pattern and/or range of the BLE peripheral module may alternatively or additionally be changed at this time. In this way, the transmit signal power, antenna pattern and/or range of the BLE peripheral module may be periodically changed while a person is looking for another person, a piece of equipment, or other object within the facility. Subsequently, step 240 is performed where method 200 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A sensor system, comprising:
    a Bluetooth Low Energy ("BLE") network comprising at least two BLE enabled nodes between which a first BLE link is established as a point-to-point link for single-hop transmission; and
    a Wireless Sensor Network ("WSN") controlling BLE link activity within the BLE network such that the first BLE link is active in a first mode under a first condition and converted to a second mode under a second condition different from the first condition;
    wherein the at least two BLE enabled nodes have an indirect non-BLE based network connectivity through the WSN.

2. The sensor system of claim 1, wherein the WSN further configures operations of WSN end nodes.

3. The sensor system of claim 1, wherein the at least two BLE enables nodes perform operations to facilitate (a) locating a person or object in a specified area or (b) a provision of services to users of mobile communication devices which are BLE enabled and reside within the specified area.

4. The sensor system of claim 1, wherein the point-to-point link is used exclusively for single-hop transmissions.

5. The sensor system of claim 1, wherein the WSN allows remote web-based control of the at least two BLE enabled nodes.

6. The sensor system of claim 1, wherein the sensor system comprises a security and access control system, a fire monitoring system, or a person or asset location system.

7. The sensor system of claim 1, wherein the at least two BLE enabled nodes comprise electronic window locks, electronic door locks, motion sensors, area security devices, fire detectors, electronic access cards worn by individuals, or tags secured to objects.

8. The sensor system of claim 1, wherein a first one of the at least two BLE enabled nodes comprises a BLE central node.

9. The sensor system of claim 8, wherein the BLE central node comprises a mobile communication device that is BLE enabled.

10. The sensor system of claim 8, wherein the BLE central node's communication with the WSN is direct or indirect via a cell network.

11. The sensor system of claim 8, wherein a second one of the at least two BLE enabled nodes outputs an audio alarm, a visual alarm, a tactile alarm or a radio signature alarm message indicating a distance between the first and second ones of the at least two BLE enabled nodes.

12. The sensor system of claim 1, wherein the WSN communicates a command signal to at least one of the at least two BLE enabled nodes for disabling an auditory output or enabling circuitry for generating radio signature alarm messages.

13. The sensor system of claim 1, wherein the WSN communicates a command signal to at least one of the at least two BLE enabled nodes for enabling an audio, visual or tactile alarm.

14. The sensor system of claim 1, wherein the establishment of the first BLE link is at least partially controlled by the WSN.

15. The sensor system of claim 1, wherein the WSN causes a signal power, a duty cycle, an antenna pattern of a BLE antenna, a mode, or a security-related characteristic of one of the at least two BLE enabled nodes to change.

16. A sensor system, comprising:
    a Bluetooth Low Energy ("BLE") network comprising at least two BLE enabled nodes between which a first BLE link is established as a point-to-point link used exclusively for single-hop transmissions; and
    a Wireless Sensor Network ("WSN") controlling BLE link activity within the BLE network such that the first BLE link is active in a first mode under a first condition and converted to a second mode under a second condition different from the first condition;
    wherein the at least two BLE enabled nodes have an indirect non-BLE based network connectivity through the WSN.

* * * * *